United States Patent
Jo et al.

(10) Patent No.: US 10,853,632 B2
(45) Date of Patent: Dec. 1, 2020

(54) METHOD FOR ESTIMATING HUMAN EMOTIONS USING DEEP PSYCHOLOGICAL AFFECT NETWORK AND SYSTEM THEREFOR

(71) Applicant: Korea Advanced Institute of Science and Technology, Daejeon (KR)

(72) Inventors: Sungho Jo, Daejeon (KR); Byung Hyung Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 98 days.

(21) Appl. No.: 16/214,011

(22) Filed: Dec. 7, 2018

(65) Prior Publication Data
US 2019/0347476 A1 Nov. 14, 2019

(30) Foreign Application Priority Data

May 9, 2018 (KR) .................. 10-2018-0053173
Oct. 22, 2018 (KR) .................. 10-2018-0125780

(51) Int. Cl.
*G06K 9/00* (2006.01)
*G06N 3/04* (2006.01)
(Continued)

(52) U.S. Cl.
CPC ....... *G06K 9/00335* (2013.01); *G06K 9/6267* (2013.01); *G06N 3/04* (2013.01); *G06T 7/0012* (2013.01)

(58) Field of Classification Search
CPC .... G06K 9/00335; G06K 9/6267; G06N 3/04; G06T 7/0012
(Continued)

(56) References Cited

U.S. PATENT DOCUMENTS 5,625,377 A * 4/1997 Jenson .................. G06F 3/0488
715/860
8,180,638 B2 * 5/2012 Kim ........................ G10L 17/26
704/246

(Continued)

FOREIGN PATENT DOCUMENTS

CN          109918499    *  6/2019    ............. G06F 17/27
KR    10-2003-0063640 A     7/2003

OTHER PUBLICATIONS

Kim, et al., "Deep Physiological Affect Network for the Recognition of Human Emotions," IEEE on Affective Computing, Journal of $L^A T_E X$ Class Files, vol. 14, No. 8, Aug. 2015, published Jan. 8, 2018, 14 pages, plus Abstract.

(Continued)

*Primary Examiner* — Jerome Grant, III
(74) *Attorney, Agent, or Firm* — Foley & Lardner LLP

(57) ABSTRACT

Disclosed are a method and a system for estimating human emotions using a deep psychological affect network for human emotion recognition. According to an embodiment of the present disclosure, a method for estimating emotion includes obtaining a physiological signal of a user, learning a network, which receives the obtained physiological signal, by using a temporal margin-based classification loss function considering a temporal margin, when the learning is in progress along a time axis, and estimating an emotion of the user through the learning of the network using the temporal margin-based classification loss function.

17 Claims, 11 Drawing Sheets

(51) Int. Cl.
    *G06T 7/00*      (2017.01)
    *G06K 9/62*      (2006.01)
(58) Field of Classification Search
    USPC ........................................... 382/100
    See application file for complete search history.

(56) References Cited

U.S. PATENT DOCUMENTS

2018/0160982 A1* 6/2018 Laszlo ................. A61B 5/0531
2019/0156951 A1* 5/2019 Patil .................... A61B 5/7221

OTHER PUBLICATIONS

Korean Office Action issued in Korean Patent Application No. 10-2018-0125780 dated May 29, 2020, with Machine Translation, ten (10) pages.

* cited by examiner (a)

(b)

10-20 System of Electrode Placement

Left Hand

METHOD FOR ESTIMATING HUMAN EMOTIONS USING DEEP PSYCHOLOGICAL AFFECT NETWORK AND SYSTEM THEREFOR

CROSS-REFERENCE TO RELATED APPLICATIONS

This application claims priority under 35 U.S.C. § 119 to Korean Patent Application No. 10-2018-0053173 filed on May 9, 2018, and Korean Patent Application No. 10-2018-0125780 filed on Oct. 22, 2018, in the Korean Intellectual Property Office, the disclosures of which are incorporated by reference herein in their entireties.

BACKGROUND

Embodiments of the inventive concept described herein relate to a technology capable of estimating human emotions, and more particularly, relate to a method capable of improving the performance of emotion recognition by generating a physiological model, for example, a deep psychological affect network (DPAN) based on a deep learning network and a temporal margin-based loss function and by recognizing the emotion of a human by using the generated physiological model, and a system thereof.

The conventional research on the recognition of human emotions has utilized various technologies using a biometric sensor, and miniaturized biometric sensors and advanced mobile computing technologies enable a vital sign to be monitored continuously by using a technology called "everyday technology". These sensors provide electroencephalography (EEG), the variability of heart rate, pulse oximetry and galvanic skin response data to be used to reflect emotional changes.

Herein, the data helps to understand the causes of mental health pathologies such as stress. However, it is difficult to build a reliable automation system capable of understanding emotional dynamics, because the emotion is triggered and the characteristics of the vital sign associated with the emotion are complex.

The emotion is a multicomponent phenomenon: the emotion may be expressed in a variety of different ways and may be concealed as time goes on. It is difficult to measure the emotion and to accurately understand the emotion due to the complexity of neural mechanisms that process the emotion. Even though the vital sign is affected by a noise from various artifacts, low signal-to-noise ratio (SNR) of a sensor, and inter-subject variability and intra-subject variability of physiological activity, the change of the vital sign is affected by the human emotions.

Many theories for understanding the emotion have been proposed due to the multifaceted nature of the emotion. One conventional technology according to an embodiment has explained the multifaceted nature of the emotion by using an "umbrella" concept when the role of a psychological component is mentioned; the concept includes the various processes that generate the various components of the emotion, associations thereof, and the classification of these elements into specific emotions.

Emotional lateralization is an asymmetric expression of emotion processing between the left and right hemispheres. The conventional study shows the asymmetric activation of two distinct cerebral hemispheres. The oldest theory of the emotional lateralization asserts that the left hemisphere is associated with the cognitive procedure, whereas the right hemisphere is associated with the emotion processing. The theory was supported by several studies based on experiments on facial expressions. However, in understanding human emotions, many alternative studies have reported various brain asymmetry patterns, which go beyond the dominant role of the right hemisphere, particularly patterns associated with positive and negative emotions.

The valence hypothesis assumes that the center of a positive feeling is present in the left hemisphere and the center of a negative feeling is present in the right hemisphere. The conventional study verifies the hypothesis and shows the asymmetric activation in the frontal region. Another alternative to the hypothesis is the motivational approach-withdrawal hypothesis: according to the hypothesis, the emotion is closely associated with the direction of individual behavior and motivation in the environment, and is categorized by using evolutionary concepts. Happiness, surprise, and anger are classified as approach emotions because of the tendency to induce movement to environmental stimuli; however, sadness, fear and disgust are associated with withdrawal behavior because of the tendency to withdraw environmental causes of disgusting stimuli.

The positive/negative and approach/withdrawal hypotheses have many similar aspects, but there is a great difference in the emotion classification of anger. In the positive/negative model, the anger is regarded as a negative emotion together with sadness, fear, and disgust; however, in the approach/withdrawal model, the anger is classified as an approach emotion. They are assigned to categories such as happiness and surprise, because this is the source of stimulation and the quarrel with individuals. Despite these discrepancies, the hypotheses are complementary and have been supported by many studies over the last several decades.

The discovery of hemispheric asymmetry associated with the emotion has led to the implementation of relevant brainwave functions such as differential on symmetric EEG electrodes and rational asymmetry. A technology according to an embodiment has proposed an EEG-based framework for recognizing four emotional states during music listening: the technology has investigated the most relevant independent features of emotion processing in different objects and has tested the usefulness of multiple classifiers. Moreover, the technology has claimed that spectral power asymmetry-based features are superior to other features in characterizing brain dynamics as a response to four emotion states (joy, anger, sadness, pleasure). A technology according to another embodiment has provided a method of automatically recognizing emotion states during four different classification tasks; in this model, the mutual information between the spectral-temporal physiological patterns of the electrodes is quantified between hemispheres. The feature-based approach has been widely used in the emotional computing field and has been developed by using improved signal processing; however, most studies may have difficulty when attempting to develop thematic differentiation factors for other emotions, and thus the feature-based approach depends on other small data sets.

Several theories of the emotion indicate that physiological activity is important to understand the emotion. As a result, the research on human emotions using physiological signals has been widely conducted and has greatly developed in many aspects over the past several decades.

Most emotion recognition methods include changes in the central nervous system (CNS) and changes in the autonomic nervous system (ANS) extracted by specific emotion states. Both systems are considered as a main component in the emotional computing research. The use of the CNS-based method is justified by the fact that the cerebral cortex includes several regions used to control the human emotions. In particular, the physiological signal obtained from EEG and photoplethysmography (PPG) have been widely used for emotion recognition, and each emotion recognition has its own advantages.

The EEG measures the electrical activity of a brain. The EEG refers to the recording of spontaneous electrical activity of the brain with several electrodes placed on the scalp. Despite the low spatial resolution of the scalp, a very high temporal resolution of this method is useful in clinical applications. For example, epilepsy and other sleep disorders may be verified by detecting transient anomalies from EEG readings. Moreover, the non-invasiveness and the mobility of the EEG have expanded the use thereof to the brain-computer interface (BCI) field that is an external device communicating with the user's brain. The EEG has been extensively pursued by many studies associated with control strategies such as motor imagery and visual evoked potential.

Most EEG-related studies have relied on feature-based classifiers. Features are extracted and selected to classify discrete emotions, upon selecting an electrode based on neuroscientific assumptions. For example, the technology according to an embodiment has described a real-time EEG-based emotion recognition system based on a standardized movie clip database: similarly, in the technology according to another embodiment, the characteristics of the brain wave feature for emotion classification and a technology for tracking the trajectory of the emotion change has been studied. They have extracted features for assessing the association between the EEG and an emotional state. The study thereof has shown that the occipital lobe and a parietal lobe are mainly associated with the emotion related to the alpha band and the crown of a head and temporal lobes are associated with the emotion related to the beta band and a left frontal lobe and a right temporal lobe are associated with the emotion related to the gamma band. In this approach, the spectral power of a specific frequency band associated with the emotion state is used for emotion recognition.

The technology according to another embodiment has developed an adaptive method for EEG signal segmentation in the time-frequency domain and an association assessment between this segment and emotion-related information. They have explained the causality between the right hemisphere and the left hemisphere, by using the EEG asymmetry of the frontal lobe and multidimensional indication information approach. The result have released that the emotional lateralization of the frontal and temporal lobes can be a good differentiation factor of the emotion state.

The EEG-based emotion recognition system has often shown improved results when other modalities have been used. The PPG for measuring blood volume among many physiological signals is widely used to calculate a heart rate (HR). The PPG uses a light-based technology for the purpose of sensing the change in a blood volume in blood circulation. The accuracy of the PPG is considered to be lower than the accuracy of electrocardiograms (ECG). However, the PPG has been used to develop a wearable biosensor in clinical application fields such as detecting mental stress in everyday life because the PPG is simple. Not only HR but also heart rate variability (HRV) has been known to be useful for emotion assessment. There have been some reports over the past two decades that HRV analysis can provide a clear assessment of autonomous function in both time and frequency domains. However, this assessment requires high time and frequency resolution. Due to these requirements, the HRV is only suitable for long-term data analysis. Some researchers have focused on overcoming these limitations. In one example of the technology thereof, a personal probabilistic framework that characterizes the emotional state has been recently developed by analyzing the dynamics of the heartbeat for the purpose of accurately assessing the real-time emotional response. In the corresponding technology, a distinct physiological signal in the time or frequency domain or the change during a single moment being a peak is considered as a candidate. However, this approach may be limited and may not be used to fully describe the emotion extraction mechanism due to complex properties and multidimensional phenomena.

In addition, a deep learning method is increasingly emerging in the fields of computer vision, robotics and neuroscience. In emotion recognition, deep learning technologies have been studied to develop more reliable and accurate effect models than the feature extraction-based emotion modeling. The technology according to an embodiment has presented the use of a deep learning methodology for modeling the effect of a human from various physiological signals. For the emotion learning model, they have used a multi-layer convolutional neural network (CNN) with a denoising automatic encoder. The corresponding technology may calculate a physiological emotion detector having the predictability with the higher automation of feature extraction through deep learning: it has been hypothesized that this will provide a more accurate emotional model. The corresponding technology has assessed the deep learning method for the subjective self-report of the player's emotions and a game data material including physiological signals: since the deep learning has calculated a much more accurate emotion model, it is shown that the performance of the deep learning is better than that of the manual ad-hoc feature extraction.

Moreover, it has been proven that the deep learning is beneficial to learn non-static data streams for complex tasks that need to understand the temporal changes of data. The technology according to another embodiment has investigated the non-static characteristics of brain activity in the context of the emotion revealed by the EEG, and has investigated meaningful frequency bands and channels for emotion recognition using a deep belief network with differential entropy characteristics extracted from multi-channel EEG data. The technology according to still another embodiment has presented a time-delay neural network (TDNN) to model the temporal relationship between consecutive emotional predictions in a two-step automatic system for continuously estimating emotional values from a facial expression image, and the corresponding technology has tried to separate the emotion state dynamics in the emotion state predicting step using the TDNN. Here, the TDNN does not bias time information and is not affected by high variability between characteristics in successive frames.

A database for emotion analysis using physiological signals (DEAP) is a multi-mode data set for analyzing various emotions in physiological signals. The DEAP data set has been generated by recording 32-channel EEG at a sampling rate of 512 Hz by using an active AgCl electrode disposed according to the International System and thirteen different peripheral physiological signals from 32 participants who have watched a music video excerpted in 1 minute-length, for example, plethysmographs. The data set includes 'valence', 'arousal', 'liking', and 'dominance' ratings, each of which has a degree of continuous from 1 to 9, and a discrete familiarity rating of 1 to 5 assessed directly after each attempt. Here, Self-Assessment Manikins (SAM) may be used to visualize the rating. For example, a thumb up and down icon may be used as 'liking'.

Furthermore, the authors of the DEAP data set has also presented a methodology using three different modalities and the result of single attempt classification for automatic emotional tagging of the video in a data set, and the three different modalities are an EEG signal, a peripheral physiological signal, and multimedia content analysis (MCA). Here, a Naive Bayes classifier may be used as the reference classifier. The reference classifier may extract physiological features including MCA in different modalities and may use the extracted physiological features to classify valence, arousal, and liking, each of which has low and high states. The low state and the high state are determined by the critical value disposed at the middle of the nine point rating. In the case of participants, the accuracy of the average of 67.7% has been achieved with respect to each modality and rating scale, using the Naive Bayes classifier: and it is concluded that there are obstacles such as signal noise, individual physiological differences, and the limited quality of self-assessment to establish a very accurate single test classification by achieving the maximum accuracy of 65.2% in multi-modal fusion. This is the reason why the reference classifier has limited ability to solve this problem. This is the reason why the independent assumption of the Naive Bayes model using the maximum-likelihood method can overlook the maximization of posterior probabilities between emotions different from each other.

Recent studies have attempted to improve the accuracy of classifying EEG-based emotion states using data sets. Technologies that fuse various modalities have been studied, and the corresponding technologies have developed a multi-modal fusion framework for studying the 3D emotion expression model and for recognizing and predicting the various emotions in the physiological signals measured using the wavelet-based multi-resolution approach. The technology according to another embodiment has proposed a probability Bayes-based classifier, and the classifier has achieved average accuracies of 70.9% and 70.1%, when classifying two levels (high and low) in valence and arousal ratings by using 32-channel EEG data with 61 additional virtual channels, such as C3-C4 and C4-P4 generated by transversal bipolar montage and longitudinal bipolar montage. The technology according to still another embodiment has presented a deep learning network that finds an unknown feature correlation from 32-channel EEG input signals by using a stacked automatic encoder for the purpose of overcoming the limited performance of the self-assessment, and this shows better performance than the Naive Bayes classifier. The technology according to yet another embodiment has investigated stable EEG patterns that are considered as neural activities that share commonality with individuals through sessions under various emotional states, and has assessed how well the model distinguishes the EEG signal between the various emotions; the result has shown the accuracy of average 69.67% by classifying the four states (high valence/high arousal, high valencerlow arousal, low valence/high arousal, and low valence/low arousal) in the DEAP using the differential entropy feature.

SUMMARY

Embodiments of the inventive concepts provide a method capable of improving the performance of emotion recognition by generating a physiological model, for example, a deep psychological affect network (DPAN) based on a deep learning network and a temporal margin-based loss function and recognizing the emotion of a human by using the generated physiological model, and a system thereof.

According to an exemplary embodiment, a method for estimating emotion includes obtaining a physiological signal of a user, learning a network, which receives the obtained physiological signal, by using a temporal margin-based classification loss function considering a temporal margin, when the learning is in progress along a time axis, and estimating an emotion of the user through the learning of the network using the temporal margin-based classification loss function.

According to an exemplary embodiment, the obtaining of the physiological signal includes obtaining at least one physiological signal of a brain wave signal and a heartbeat signal of the user from an image sequence.

According to an exemplary embodiment, the temporal margin-based classification loss function assigns a penalty such that the temporal margin over time is maintained or continuously increases.

According to an exemplary embodiment, the learning includes extracting a physiological feature for the obtained physiological signal with respect to an image sequence, configuring a spectrum-time tensor by using the extracted physiological feature, and inputting the configured spectrum-time tensor to learn the network such that the temporal margin-based classification loss function converges to a minimized value.

According to an exemplary embodiment, the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

According to an exemplary embodiment, the learning includes learning a Convolutional Long Short-Term Memory (LSTM) network by using the temporal margin-based classification loss function.

According to an exemplary embodiment, a method of estimating emotion includes providing a temporal margin-based classification loss function considering a temporal margin, when learning is in progress along a time axis, and estimating an emotion of a user through learning using the temporal margin-based classification loss function.

According to an exemplary embodiment, the estimating includes extracting a physiological feature for a physiological signal of the user obtained with respect to an image sequence, configuring a spectrum-time tensor by using the extracted physiological feature, and estimating the emotion of the user by inputting the configured spectrum-time tensor to learn the network such that the temporal margin-based classification loss function converges to a minimized value.

According to an exemplary embodiment, the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

According to an exemplary embodiment, an emotion estimating system includes an obtainment unit configured to obtain a physiological signal of a user, a learning unit configured to learn a network, which receives the obtained physiological signal, by using a temporal margin-based classification loss function considering a temporal margin, when learning is in progress along a time axis, and an estimation unit configured to estimate an emotion of the user through the learning of the network using the temporal margin-based classification loss function.

According to an exemplary embodiment, the obtainment unit is configured to obtain at least one physiological signal of a brain wave signal and a heartbeat signal of the user from an image sequence.

According to an exemplary embodiment, the temporal margin-based classification loss function assigns a penalty such that the temporal margin over time is maintained or continuously increases.

According to an exemplary embodiment, the learning unit is configured to extract a physiological feature of the obtained physiological signal with respect to an image sequence, to configure a spectrum-time tensor by using the extracted physiological feature, and to input the configured spectrum-time tensor to learn the network such that the temporal margin-based classification loss function converges to a minimized value.

According to an exemplary embodiment, the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

According to an exemplary embodiment, the learning unit is configured to learn a LSTM network by using the temporal margin-based classification loss function.

According to an exemplary embodiment, a method for estimating emotion includes obtaining a physiological signal of a user and estimating an emotion of the user corresponding to the physiological signal by using a temporal margin-based classification loss function considering a temporal margin.

According to an exemplary embodiment, the estimating includes learning a network, which receives the obtained physiological signal, by using the temporal margin-based classification loss function, when learning is in progress along a time axis and estimating an emotion of the user through the learning of the network using the temporal margin-based classification loss function.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
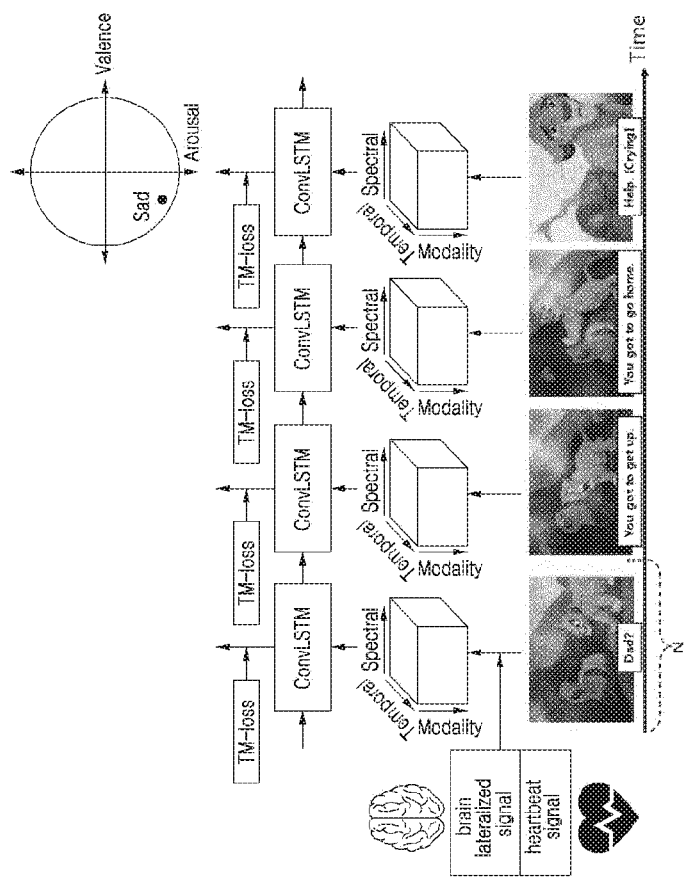
FIG. 1 illustrates a conceptual diagram for describing DPAN, according to an embodiment of the present disclosure.

Advantage points and features of the disclosure and a method of accomplishing thereof will become apparent from the following description with reference to the following figures, wherein embodiments will be described in detail with reference to the accompanying drawings. The inventive concept, however, may be embodied in various different forms, and should not be construed as being limited only to the illustrated embodiments. Rather, these embodiments are provided as examples so that the present disclosure will be thorough and complete, and will fully convey the concept of the inventive concept to those skilled in the art. The inventive concept may be defined by scope of the claims. Meanwhile, the terminology used herein to describe embodiments of the invention is not intended to limit the scope of the invention.

The terminology used herein is for the purpose of describing embodiments and is not intended to limit the invention. As used herein, the singular terms are intended to include the plural forms as well, unless the context clearly indicates otherwise. The terms "comprises" and/or "comprising" used herein does not exclude presence or addition of one or more other components, steps, operations, and/or elements in addition to the aforementioned components, steps, operations, and/or elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, preferable embodiments of the present disclosure will be described with reference to the accompanying drawings. The same reference numerals are used for the same components in the drawings and redundant explanations for the same components are omitted.

The present disclosure generates a physiological model, for example, a deep psychological affect network (DPAN) based on a deep learning network and a temporal margin-based loss function and recognizes the emotion of a human by using the generated physiological model, thereby improving the performance of emotion recognition.

Here, the present disclosure may learn a deep learning network, for example, a convolutional Long Short-Term Memory (LSTM) network by using a temporal margin-based loss function to generate a physiological model.

The present disclosure may formulate the emotion recognition as a problem of spectrum-time physiological sequence learning; specifically, the emotion recognition problem is formulated as a problem of spectrum-time sequence classification of a bipolar EEG signal and a PPG signal which become the basis of brain lateralization, thereby improving the performance of emotion recognition.

Here, the temporal margin-based loss function according to an embodiment of the present disclosure may impose a penalty for the breach of trust.

The input to the DPAN according to an embodiment of the present disclosure is the sequence of physiological signals, for example, the sequence of the bipolar EEG signal and the PPG signal; the emotional state of the user may be estimated by learning the expression of the signal using the temporal margin-based loss function depending on the emotional valence-arousal model.

The brain lateralization refers to the idea that half of the brain (the left and right cerebral cortices of the brain) has a difference in function. More specifically, emotional lateralization is the asymmetric expression of emotion perception and expression processing in the cerebral hemisphere. The main advantage of differential lateralization of the EEG signal is that the minimum configuration requires only two electrodes. The simplicity enables the development of everyday technology such as a lightweight EEG device capable of being easily worn and allows the user to act freely in everyday situations.

The present disclosure learns the differential physiological activation of the hemispherical EEG signal and the hemispherical PPG signal and quantifies the differential physiological activation so as to recognize emotions.

In addition, the present disclosure may better recognize emotions in time by using a temporal margin-based classification loss function and may locate a location. The typical LSTM model has the advantage of memorizing useful patterns for previous observations and providing a longer-range context for current predictions. However, if only classification loss is used when such a model is learned, the proper penalty may not be generally imposed on false prediction. This is the reason why the LSTM only implicitly considers the previous hidden state and the context to be transmitted in the form of a memory as time goes on. The suggestibility at a point in time when an LSTM model is learned is particularly problematic in learning long-term sequence data such as a physiological signal including complex emotional induction mechanisms. The present disclosure may add an explicit time limit to LSTM learning to capture the apparent progress of the overall emotion from the beginning of the emotion to the present time through the learned model.

Embodiments of the present disclosure will be described in detail with reference to the accompanying drawings.

FIG. 1 illustrates a conceptual diagram for describing DPAN, according to an embodiment of the present disclosure: FIG. 1 illustrates a model used for emotion recognition.

As illustrated in FIG. 1, the present disclosure extracts two physiological features such as a brain lateralization feature and a heartbeat feature by using two physiological signals, for example, a brain lateralization signal and a heart rate signal after every time interval N and configures a spectrum-time tensor. Then, the present disclosure inputs the extracted features into ConvLSTM to calculate the emotional score of the emotion through temporal margin-based loss (TM-loss) that is a loss model of the present disclosure. The output of the final sequence is selected to represent the emotion for the 2-dimensional valence-arousal model of the entire sequence.

The model used in the present disclosure includes two major components: extraction of physiological features based on formulation of the emotion recognition problem focusing on time-frequency analysis of a bipolar EEG signal and a PPG signal, which become the basis of brain lateralization, and a temporal margin-based classification loss function that calculates the emotional score based on the ConvLSTM, a hidden state of the ConvLSTM at the previous time step, a memory, and the features of the current frame. The present disclosure may apply a dropout to a non-repetitive connection using the ConvLSTM.

That is, as illustrated in FIG. 1, the present disclosure inputs a vital sign, which changes depending on the emotion that a user feels while watching a movie called a "lion king", that is, the EEG signal and the PPG signal as an input signal and combines the input data of two types of time series with the modality to transform the combined result into three-dimensional data of spectrum, time, and modality. The transformed three-dimensional data is input as the input of the ConvLSTM, and the learning is performed such that the loss function converges to the minimized value by using the temporal margin-based classification loss function (TM-loss). In FIG. 1, the learning result learned through the four scenes along the time axis reaches the feeling of sadness, and thus the feeling of sadness in the two-dimensional valence-arousal model may be represented. Even though only four scenes are illustrated in FIG. 1, an embodiment is not limited thereto. For example, the number of scenes or the number of frames may vary depending on the situation.

Formulation of Emotion Recognition Problem

For the purpose of describing the complex emotional mechanisms, the DPAN focuses on time-frequency analysis of a bipolar EEG signal and a PPG signal that become the basis of brain lateralization. At each time frame, the DPAN outputs a one-dimensional vector indicating the emotional state adjusted from 1 to 9 by using the 2-channel EEG signal and the PPG signal as an input.

Here, for the purpose of detecting a physiological change in the emotion, a frequency represented as a peak, or a frequency represented by distinguishing from others in the power spectral density (PSD) that occurs at a single moment in time may be considered as a candidate. However, the approach may not process the problem of inter-subject variability and intra-subject variability due to the complex and multidimensional phenomenon of the emotion extraction mechanism.

The present disclosure uses the estimation considering local neighbors of a frequency in a time sequence, and this is superior to the method of estimating the frequency at any single time. In addition, the present disclosure may formulate emotion recognition as a spectrum-time sequence learning problem.

Figure 2:
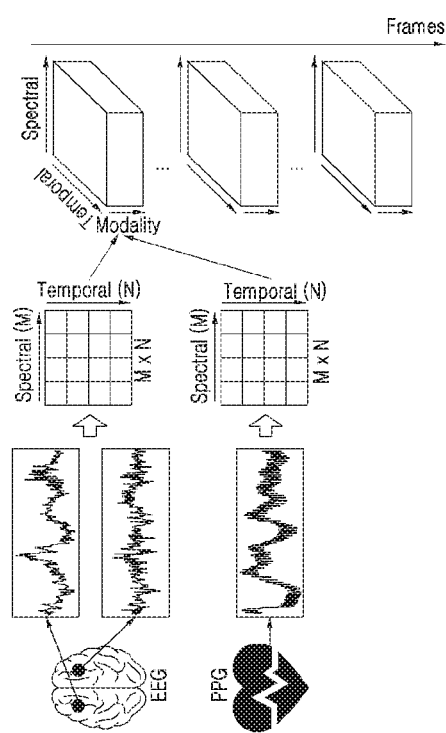
FIG. 2 illustrates an exemplary view for describing the process of extracting a physiological feature and formulation of an emotion recognition problem.

FIG. 2 illustrates an exemplary view for describing the process of extracting a physiological feature and formulation of an emotion recognition problem; as illustrated in FIG. 2, the brain lateralization feature and the heart beat feature, which are represented by M×N grids at time N, are extracted from the spectrogram of a bipolar EEG signal and a PPG signal, respectively. A tensor is configured by using spectrum-time features from two modalities (P=2).

That is, the observation value at a given time may be expressed as tensor $\chi \in \mathbb{R}^{M \times N \times P}$ under the assumption that the present disclosure obtains the EEG signal and a physiological signal from PPG sensor at time N over a spectrum-time domain, which has P different modalities and which is represented as M×N.

Here, $\mathbb{R}$ may denote the domain of the observed physiological feature; for example, $\mathbb{R}$ may denote the domain of the physiological feature extracted from the EEG signal and the PPG signal of FIG. 2.

The learning problem is may be expressed as Equation 1 below, as the identification of the correct class based on the sequence of tensor $\chi_1, \chi_2, \ldots, \chi_t$.

$$\hat{y} = \underset{y \in \mathcal{Y}}{\operatorname{argmax}} P(y \mid \chi_1, \chi_2, \ldots, \chi_t) \quad \text{[Equation 1]}$$

Herein, $\mathcal{Y}$ may mean the set of valence-arousal classes. $\mathcal{Y}$ Physiological Feature Extraction The present disclosure extracts physiological features from two modalities (P=2) of an EEG sensor and a PPG sensor. The extracted feature is represented as the M×N×P spectrum-time domain according to $\chi$ of Equation 1. Here, 'M' may denote a frequency, 'N' may denote time, and 'P' may denote modality.

The present disclosure extracts the brain asymmetric features $B_t \in \mathbb{R}^{M \times N}$ from the 2-channel EEG signal E, at each time frame t. Herein, the brain asymmetric features may become the basis of spectrums of left and right channel pairs and causal asymmetry.

The brain asymmetric features provide differential and causal interactions in the brain. The present disclosure converges on the brain asymmetric features $B_t$ to represent the causal directionality and magnitude of emotional lateralization in the feature space; $B_t$ may be expressed as Equation 2 below.

$$B_t = \xi_{rl} \circ \frac{(\zeta_l - \zeta_r)}{(\zeta_l + \zeta_r)} \quad \text{[Equation 2]}$$

Herein, 'o' may denote a Hadamard product, and matrix ξrl may denote the causal asymmetry between 'r' and '1' EEG bipolar channels.

Equation 2 may be used to measure directional interactions from channel 'r' to channel 'l'; this may mean that channel 'r' affects channel 'l', and may obtain a value between 0 and 1, the high value reflects the linear effect in the direction from 'r' to 'l'. Accordingly, the asymmetry provides information about the directionality of the causal interactions between two channels.

For the purpose of measuring causality from 'r' to 'l', the present disclosure may use the Partial Directed Coherence (PDC) scale based on the concept of Granger causality; the causality using the PDC scale based on the concept of Granger causality may be expressed as Equation 3 below.

$$\xi_{rl}(m, n) = \frac{|A_{rl(m,n)}|}{\sqrt{a_k^H(m, n) a_k(m, n)}} \quad \text{[Equation 3]}$$

Herein, m=1, ..., M, and n=1, ..., N; Art may denote the rl-th element of A(m, n); $a_k^H$ may denote a Hermitian transpose of the vector $a_k$ that is the k-th column of the matrix A(m, n).

The matrix A(m, n) may be defined as Equation 4 below.

$$A(m, n) = I - \sum_{d=1}^{P} A_d(n) z^{-d} \Big|_{z = e^{j2\pi f}} \quad \text{[Equation 4]}$$

Here, 'I' may denote an identity matrix, and frequency 'm' may vary from '0' to Nyquist rate. Matrix $A_d$ may be given as Equation 5 below.

$$A_d = \begin{bmatrix} a_{11}^d & \cdots & a_{1M}^d \\ \vdots & \ddots & \vdots \\ a_{M1}^d & \cdots & a_{MM}^d \end{bmatrix} \quad \text{[Equation 5]}$$

Herein, matrix $A_d$ may be calculated by using a causal multivariate autoregressive (MVAR) model.

The causal MVAR model may be an expression of Granger causality-based measurement such as the Granger Causality Index (GCI), Directed Transfer Function (DTF), and PDC (Partial Directed Coherence); the measurements may be defined in the framework of the MVAR model. This is the reason why the fact that PDC measurement is used in the present disclosure is defined as the frequency domain and there is directivity. That is, the fact that there is a directivity means $\xi_{rl} \neq \xi_{lr}$, $a_{rl}^d$ reflects the linear relationship between channel 'r' and channel 'l' in delay 'd'; $a_{rl}^d$ makes it possible to consider not only direct and indirect effects but also the direction of information flow between EEG channels. The MVAR model in the present invention is described in detail in the existing paper (A. K. Seth, A. B. Barrett, and L. Barnett, "Granger causality analysis in neuroscience and neuroimaging," Journal of Neuroscience, vol. 35, no. 8, pp. 3293-3297, 2015), and thus a detailed description thereof will be omitted.

$$\frac{(\zeta_l - \zeta_r)}{(\zeta_l + \zeta_r)}$$

denotes the spectral asymmetry between the 'l' and 'r' EEG channels; $\zeta_l$ and $\zeta_r$ denote the logarithm of spectral power for a specific band in the left and right hemispheres, respectively. The asymmetry represents the degree of hemispheric lateralization. When the asymmetry characteristic increases, the activation of the left hemisphere increases to become greater than the activation of the right hemisphere. Accordingly, the brain asymmetry characteristic of Equation 2 indicates the directionality and magnitude of emotional lateralization between two hemispheres.

The present disclosure extracts the heart rate characteristic He from the PPG signal $P_t$ at each time frame t over the M×N spectrum-time domain; the frequency with the peak in the PSD of the PPG signal is considered as a candidate for an actual heart rate. The data form a candidate set as time goes on.

Convolutional LSTM (ConvLSTM)

The present disclosure may apply ConvLSTM to recognize the emotion state formulated in Equation 1. The ConvLSTM is obtained by extending fully connected LSTM (FC-LSTM); the ConvLSTM has a convolution structure in both the input-state conversion and the state-state conversion. The ConvLSTM represents another gate as a three-dimensional tensor, in which an input, a hidden state, and an output are included, and in which last two dimensions are spatial dimensions (rows and columns). The ConvLSTM determines the future state of a specific cell in a grid based on the previous state of a neighbor and the input by using the convolution operator in the state-state conversion and the input-state conversion. The operator in the convolutional structure makes it possible to capture the local dependency of space-time data equal to the formula in Equation 1. Processing the space-time data is a major drawback of the FC-LSTM. In the input-state conversion and the state-state conversion, the entire connection of FC-LSTM includes too much redundancy for encoding spatial information.

When $\chi$, C, and $\mathcal{H}$ respectively represent an input, a cell output, and a hidden state, the main equation of the ConvLSTM may be expressed as Equation 6 below.

$$i_t = \sigma(W_{xi} * \chi_t + W_{hi} * H_{t-1} + W_{ci} \circ C_{t-1} + b_i)$$

$$f_t = \sigma(W_{xf} * \chi_t + W_{hf} * H_{t-1} + W_{cf} \circ C_{t-1} + b_f)$$

$$C_t = f_t \circ C_{t-1} + i_t \circ \tan h(W_{xc} * \chi_t + W_{hc} * H_{t-1} + b_c)$$

$$o_t = \sigma(W_{xo} * \chi_t + W_{ho} * H_{t-1} + W_{co} \circ C_t + b_o)$$

$$H_t = o_t \circ \tan h(C_t) \qquad \text{[Equation 6]}$$

Here, $i_t$, $f_t$ and $o_t$ may denote the gate of the ConvLSTM represented by the 3D tensor, and '*' may denote the convolution operator.

A cell may store and search for information over a long period of time, through the activation of the input, the output, and a forget gate. As such, this solves the gradient problem that longer-range context information is accessed and then disappears. In the case of representing the hidden state and the cell output of the FC-LSTM by using a 3D tensor of which the last two-dimension is '1', the conventional FC-LSTM may be regarded as a special case of the ConvLSTM in a single cell. The ConvLSTM may capture space-time (or spectrum-time) better than the FC-LSTM.

For the purpose of identifying the emotion state, the ConvLSTM with a linear layer calculates the emotional score based on the physiological feature of the current time frame t, the hidden state, and the ConvLSTM memory of the previous step. The present disclosure may use the softmax layer as the final linear layer, and thus the emotional score may be the softmax output of the model.

Temporal Martin-Based Classification Loss

The ConvLSTM is efficient: on the other hand, a proper penalty may not be imposed to false prediction when only classification loss is used in learning. This model may impose a penalty on the same error regardless of the emotional context that the model already processes. For example, the feeling of sadness involves negation, anger, negotiation, depression, and acceptance in turn. Because the emotion includes the negotiation and the acceptance, satisfaction may be the worst result calculated by the model. The LSTM, in which the sequence of sadness emotions is provided, outputs the same penalty regardless of the amount of sequences already processed. For example, when the LSTM processes the sad emotion that leads to sadness, false 'emotion satisfaction' imposes the same penalty as if the model shows anger. However, outputting an inaccurate emotion after the LSTM looks at the emotion as depression needs to further impose a penalty than outputting an inaccurate emotion after the LSTM looks at the emotion as anger. Because the LSTM only implicitly considers the previous hidden state and the context to be transmitted as time goes on in the formulation process of the memory, it is essential to impose an accurate penalty. When there is no accurate penalty, the LSTM model becomes difficult to learn from long-term sequence data such as a physiological signal including complex emotional extraction mechanisms. This mechanism is not considered as a preceding step to the emotion, but is considered a configuration step of the emotion for a relatively long period of time. Accordingly, learning the progress pattern of the emotion in learning is very important in developing a reliable emotion model.

For the purpose of solving the above-described problem, the present disclosure modifies the existing classification loss function to formulate a new loss function based on the temporal margin between the correct emotion state and the incorrect emotional state. If a specific emotion is often observed, the model according to an embodiment of the present disclosure may be more convinced of the emotional extraction as the recognition process progresses.

Figure 3:
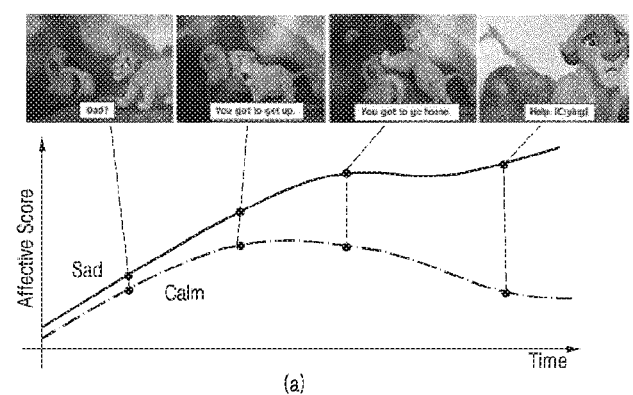
FIG. 3 illustrates an example of the theoretical basis (a) of the loss formula in the present disclosure and the discriminative margin (b) of an emotion over time.
Figure 3:
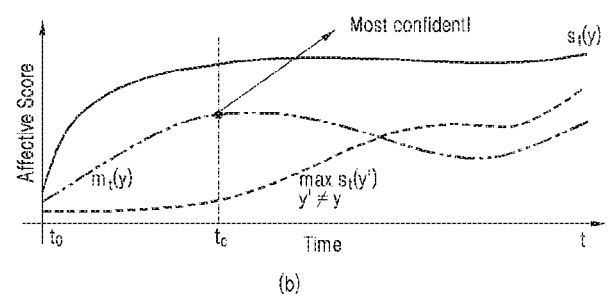

(a) of FIG. 3 illustrates a sad scene sequence of the movie "The Lion King (1994)": (a) of FIG. 3 is a scene sequence in which "Mufasa" is killed by "Scar" while trying to rescue his son "Simba". The sequence of the film includes the step of a complex emotion such as sadness or calmness: the sadness grows as the sequence progresses, and then Simba culminates in a scene in which Simba perceives the death of Simba's father "Mufasa" and Simba's calm feeling fades away. That is, as illustrated in FIG. 3, when a user feels sad emotion increasingly, the present disclosure ensures that there is a correct emotional state of the line corresponding to the sad feeling and that there is no false state of the line corresponding to the calm emotion.

For the purpose of distinguishing margins that do not decrease monotonically from other margins while the emotion is in progress, the function of the present disclosure limits the emotional score of the correct emotion state. Accordingly, the present disclosure presents a temporal margin-based classification loss function that distinguishes between an accurate emotion classification and an inaccurate emotion classification.

Here, the temporal margin-based classification loss function may be expressed as Equation 7 below.

$$\mathcal{L}_t = -\log s_t(y) + \lambda \max\left(0, \max_{t' \in [t_0, t-1]} m_{t'}(y) - m_t(y)\right) \qquad \text{[Equation 7]}$$

Here. $-\log s_t(y)$ may denote a general cross-entropy loss function required for learning a deep learning model; 'y' may denote the actual measurement value of emotion rating; $s_t(y)$ may denote the classified emotional score of label 'y' of the actual measurement value for time t; $m_t(y)$ may denote the discriminative margin of the emotion label 'y' at time t.

The discriminative margin $m_t(y)$ may be expressed as Equation 8 below.

$$m_t(y) = s_t(y) - \max\{s_t(y') | \forall y' \in \mathcal{Y}, y' \neq y\} \qquad \text{[Equation 8]}$$

Here, $\lambda \in \mathbb{Z}^+$ may denote a relative term for controlling the effect of $\mathbb{Z}$ the discriminative margin.

Equation 7 shows a model capable of having conviction in distinguishing between an accurate state and an inaccurate state. In other words, the temporal margin-based classification loss function according to an embodiment of the present disclosure may provide a model capable of clearly distinguishing between an accurate state of emotion and an inaccurate state of emotion. The model according to an embodiment of the present disclosure is recommended to maintain monotonicity in emotional scores as emotion learning progresses.

For example, as illustrated in (b) of FIG. 3, the discriminative margin $m_t(y)$ of emotion 'y' starts at time to: the discriminative margin $m_t(y)$ is calculated by the difference between the emotional score $s_t(y)$ of ground truth and the maximum score $\max_{g' \neq y} s_t(y')$ of all incorrect emotion states between time $t_0$ and t. The model has strong confidence in classifying the emotion state until time $t_c$. However, after time to, the temporal margin-based classification loss is not zero due to the breach of the monotonicity of the margin.

For the purpose of calculating the gradient for the model parameters while the learning is in progress, the present disclosure may calculate the gradient of the loss for $s_t(y)$, which is backpropagated as time goes on. Also, for simplification, the present disclosure may not calculate the gradient of the loss $s_t(y')$ or may not backpropagate the gradient of the loss $s_t(y')$.

The present disclosure uses DEAP that is the public data set widely used to analyze human emotional states, for quantitative assessment. The result shows that the model according to an embodiment of the present disclosure is very effective in recognizing human emotion, by comparison with two existing models.

DEAP Data Set

Figure 4:
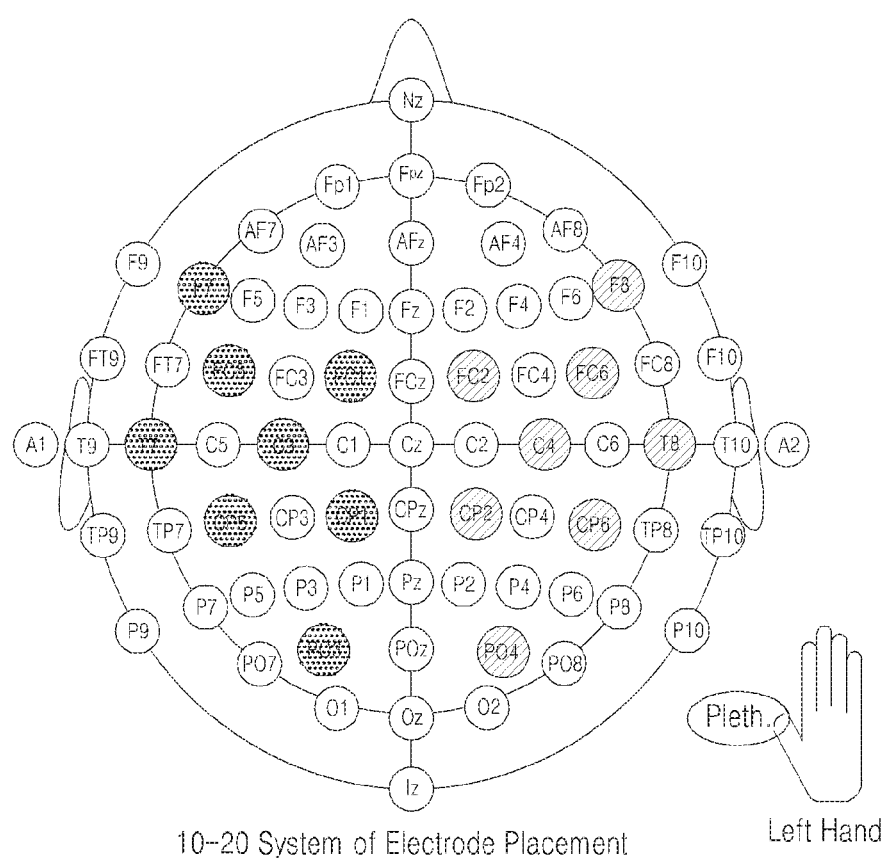
FIG. 4 illustrates placement of an EEG electrode used in the present disclosure and plethysmographs used to obtain a physiological signal.

The present disclosure uses eight symmetrical pair electrodes of the right hemispheres (F8, FC2, FC6, C4, T8, CP2, CP6 and PO4) and the left hemisphere (F7, FC1, FC5, C3, T7, CP1, CP5 and PO3) from the DEAP data set. The present disclosure selects electrode channels for eight symmetric pairs with high correlation with the emotion at 32 electrodes. For the purpose of calculating physiological features associated with a heart rate (HR), the present disclosure uses plethysmographs that measure the blood volume of the participant's left thumb in addition to the EEG signal. FIG. 4 illustrates placement of an EEG electrode used in the present disclosure and plethysmographs used to obtain a physiological signal. Continuous ratings of valence and arousal are converted to discrete ratings rounded off to negative infinity.

Experiment Setup

Since the present disclosure is focused on the brain lateralization, the eight selected electrodes and plethysmograph data recorded during 1280 videos together with 64 combinations of physiological signals per video generate 81920 physiological data points. The present disclosure divides the entire data set into five portions with 16384 physiological data points, for testing. The present disclosure uses ⅕ (13107 physiological data points) of the remaining data for validation test and uses ⅘ (52429 physiological data points) of the remaining data as the training set. Training data and test data are subject-independent, and this means that data has been randomly selected. Valid data may be randomly selected while maintaining the distribution of ratings to be balanced. A highlighted 1-minute EEG signal and a plethysmograph signal are divided into 6 frames per 10 seconds. Each signal is downsampled to 256 Hz and power spectral features are extracted.

The EEG signal is filtered by a high pass filter having a 2 Hz cutoff frequency using an EEGlab toolbox; a blind source separation technology is applied to remove eye artifacts. The plethysmograph signal is refined by removing motion artifacts from the plethysmograph signal by using a constrained independent component analysis (cICA) algorithm. The cICA algorithm is an extended algorithm of ICA. In the frequency range of 4 Hz to 65 Hz, the log of spectral power is extracted from the selected electrodes and the participant's thumb. The present disclosure generates two sets of 50×50 spectrum-time features from $B_t$ and $H_t$ as input $X_t$ by using two spectrum-time data sets per frame. Here, $X_t$ may correspond to the ground truth of valence and arousal.

In the present disclosure, the performance according to an embodiment of the present disclosure may be assessed through the comparison between the model of the present disclosure, FC-LSTM, and the conventional method. The DPAN model of the present disclosure may use a 1-layer network with 256 hidden states, an input-state kernel size of 5×5, and a state-state kernel size of 5×5. For the purpose of learning the model according to an embodiment of the present disclosure, the present disclosure may use learning placements of 32 sequences. The time through the back-propagation goes on for 10 time steps, and the momentum and weight decay may be set to 0.7 and 0.0005, respectively. The learning rate may start at 0.1 and may be divided by 10 after respective 20000 iterations.

The present disclosure may attempt other configurations such as 3×3, 7×7, and 9×9 for the purpose of investigating the effect of capturing the spectrum-time correlation between the emotion and a physiological signal. With regard to FC-LSTM, three 1700-node LSTM layers with a softmax layer may be used as the output.

In the conventional method, a classifier the same as the classifier according to an embodiment of the present disclosure may use, for example, a fused Naive Bayes classifier of single-modality. Both modalities are independently processed by the Naive Bayes classifier, and each modality may be set to be contributed equally to the final determination.

Experiment Result

Figure 5A:
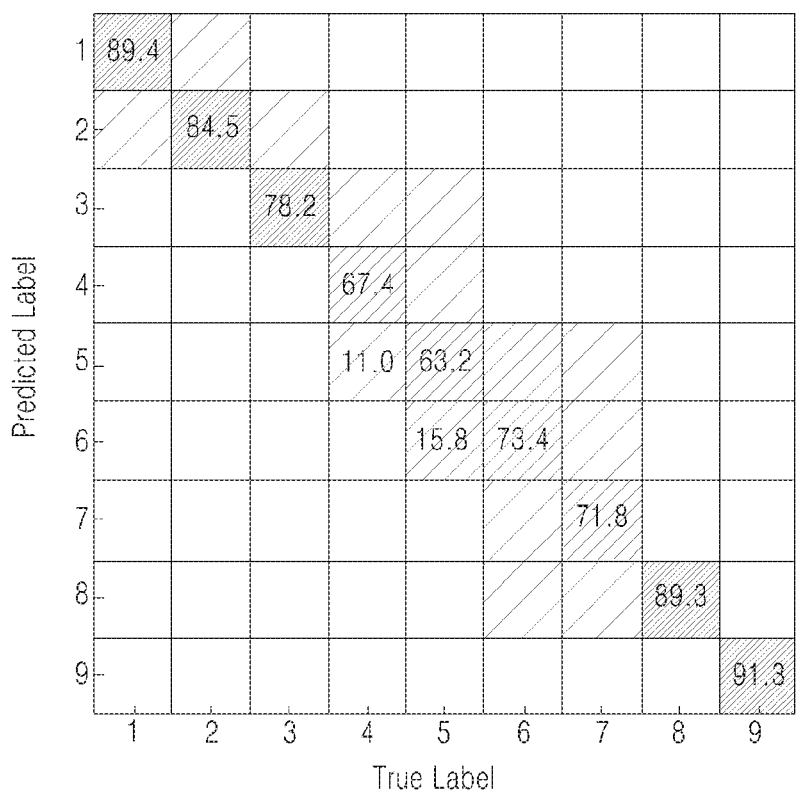
FIG. 5 illustrates an exemplary view of confusion matrices of a valence rating by a model of the present disclosure, FC-LSTM, and a conventional method.
Figure 5B:
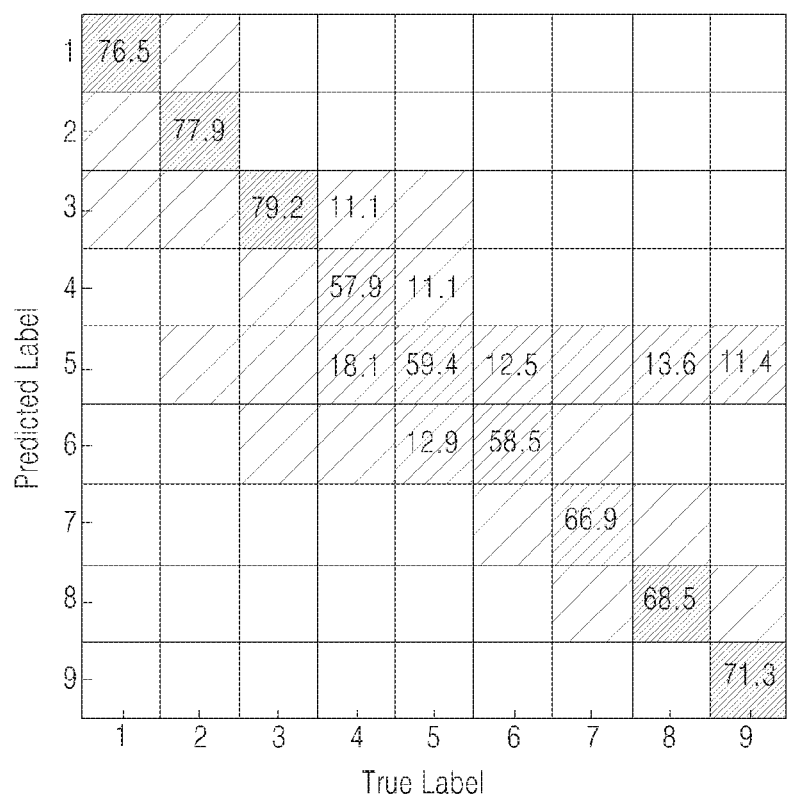
Figure 5C:
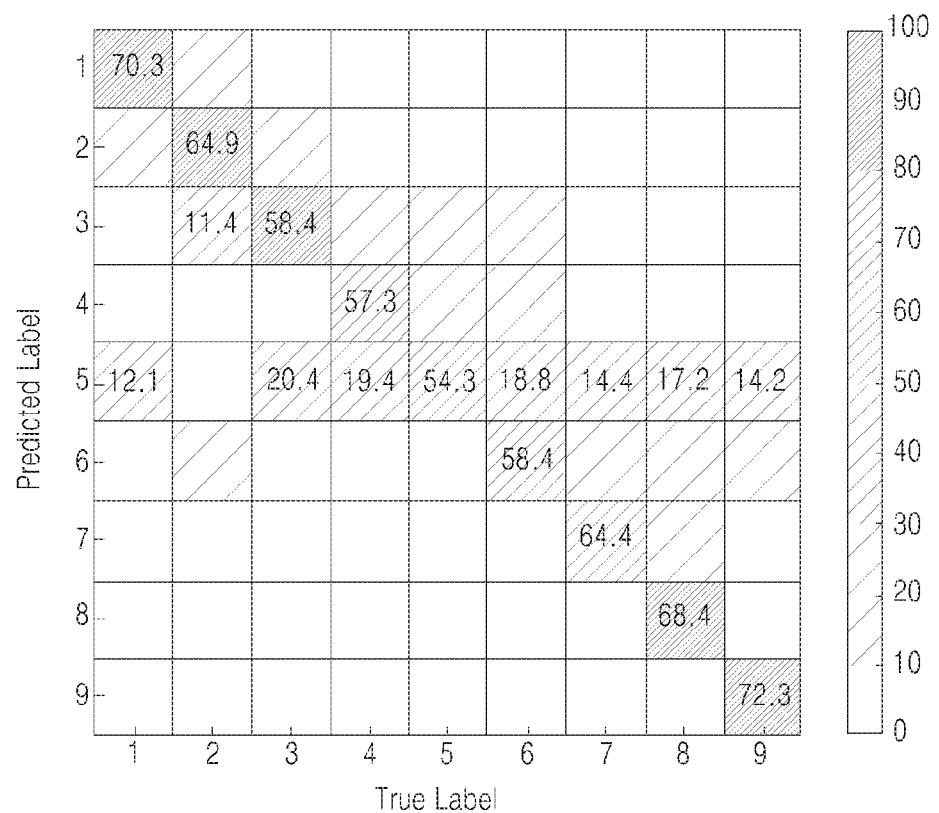
Figure 6A:
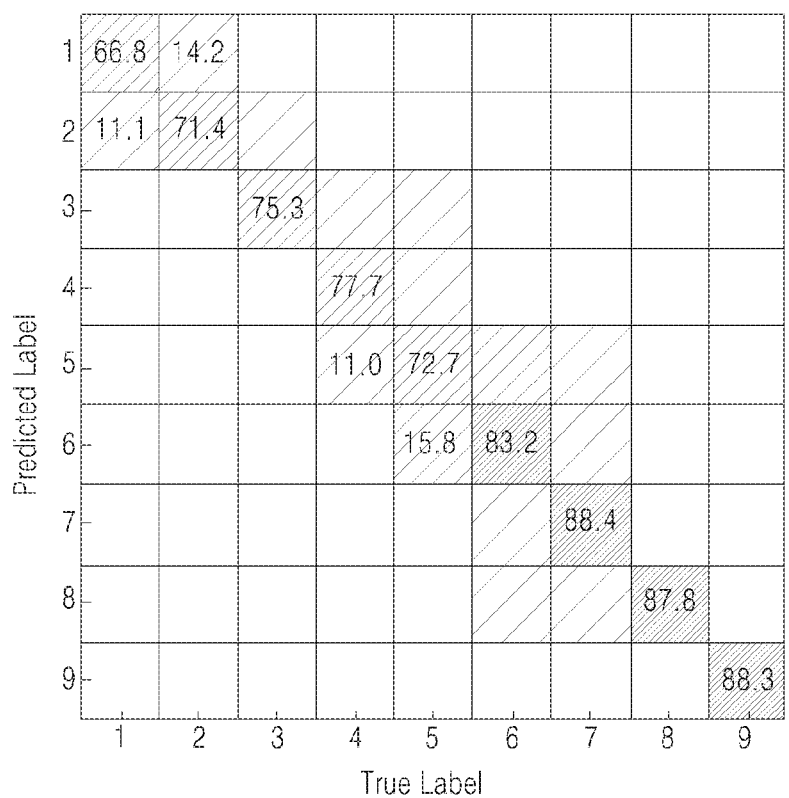
FIG. 6 illustrates an exemplary view of confusion matrices of an arousal rating by a model of the present disclosure, FC-LSTM, and a conventional method.
Figure 6B:
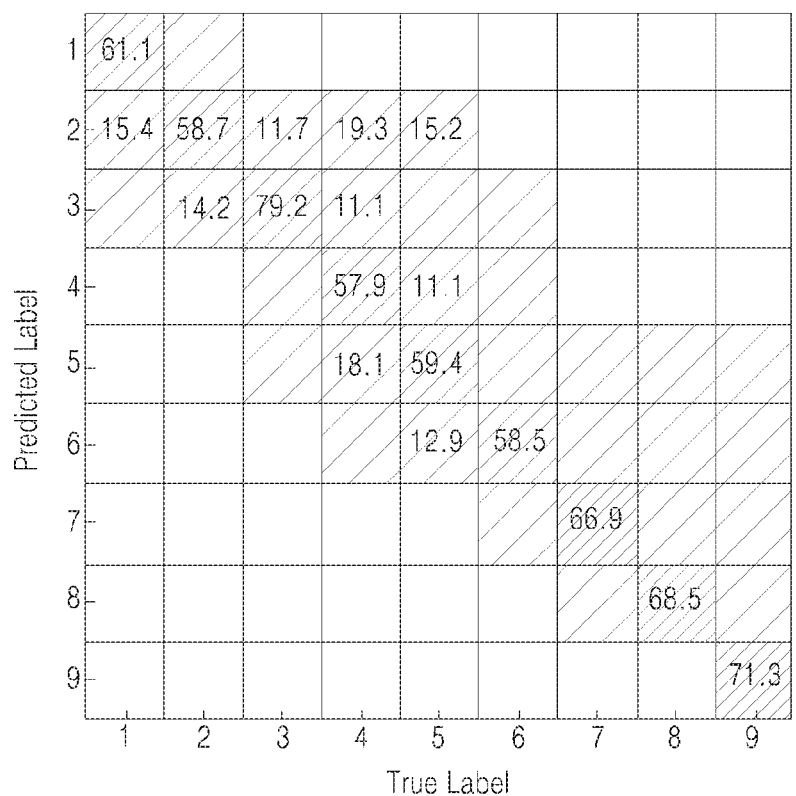
Figure 6C:
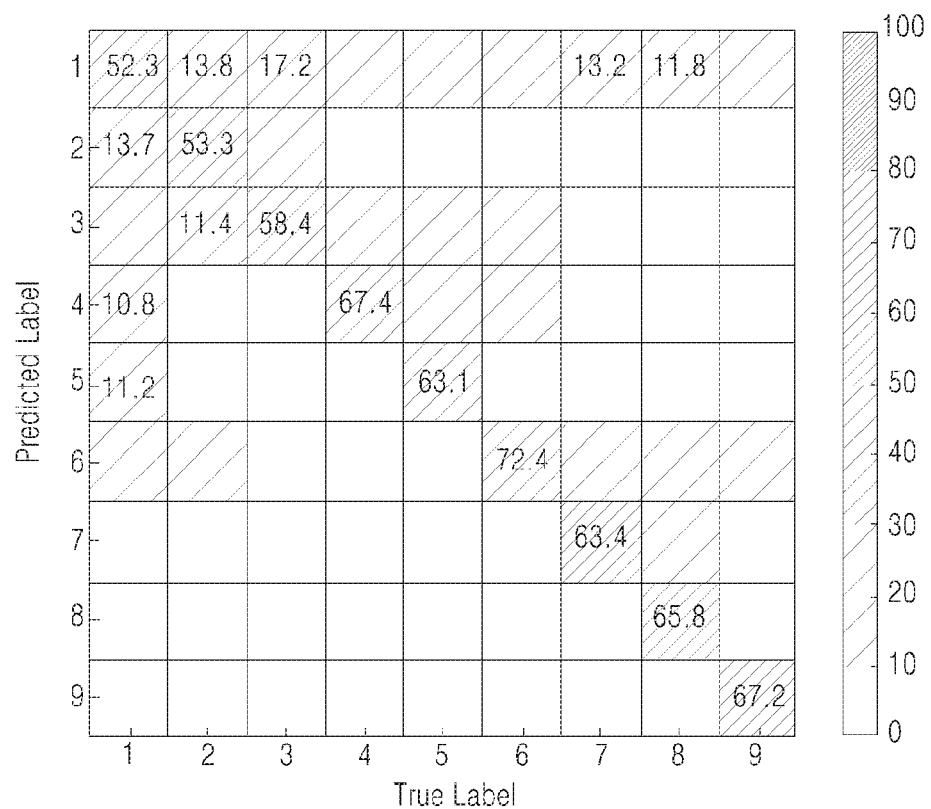

FIGS. 5 and 6 illustrate an exemplary view of confusion matrices of valence and arousal ratings by the model of the present disclosure, FC-LSTM, and a conventional method. As illustrated in FIGS. 5 and 6, it is understood that the model (DPAN) according to an embodiment of the present disclosure has the accuracies of 78.72% and 79.03% in recognizing the valence emotion and the arousal emotion, respectively; the FC-LSTM method has the accuracies of 68.45% and 66.56% in recognizing the valence emotion and the arousal emotion, respectively; the conventional method (Koelstra et al.) has the accuracies of 63.23% and 62.59% in recognizing the valence emotion and the arousal emotion, respectively. As illustrated in FIGS. 5 and 6, it is understood that the method according to an embodiment of the present disclosure has a higher accuracy in recognizing the valence emotion and the arousal emotion than the FC-LSTM method and the conventional method (Koelstra et al.).

The experiment according to an embodiment of the present disclosure shows that the method according to an embodiment of the present disclosure operates consistently compared to other methods, and this may be caused by the following two reasons. First, the model according to an embodiment of the present disclosure based on ConvLSTM may learn complex spectral-time patterns of the emotion extraction mechanism with the help of the nonlinearity of network and a convolutional structure. An input-state kernel and a state-state kernel of the convolutional structure may capture local spectrum-time patterns and may maintain local consistency that reduces inter-subject variability and intra-subject variability in physiological measurements.

On the other hand, the Naive Bayes model in the conventional method (Koelstra et al.) has difficulty in understanding or training the complexity of the signal. The estimation of parameters based on independence assumptions using the maximum-likelihood method may overlook the maximization of posterior probability between emotion classes. This limitation is important when the valence rating is '5' and the arousal rating is '1'. The classifier shows the result, in which the prediction performance of a specific instance is not good, such as the case where the valence rating is '5' and the arousal rating is '1'; this is the reason why the classifier overly learns the expression of the two ratings, and thus an identification error occurs. Accordingly, the ability to use interactions between physiological features may be lost. The full connection structure of FC-LSTM has too many redundant connections, and it is impossible to make optimization for capturing important local consistency in the spectrum-time pattern.

Second, the present disclosure may distinguish physiological patterns by imposing a penalty for false classification. The temporal margin-based classification loss according to an embodiment of the present disclosure increases physiological distinctness during training. However, the Naive Bayes model and the LSTM using only classification loss may not achieve distinctness. In addition, when the Naive Bayes model and the LSTM use the classification close to the valence rating between 4 and 6 and the arousal rating between 1 and 3, this problem may be more severe. Emotional stimulation operates well under a high arousal/high valence (HAHV) condition and a high arousal/low valence (HALV) condition. The emotional stimulation of the conditions may induce strong physiological changes. The Naive Bayes model and the LSTM have difficulties in capturing small physiological changes caused by a neutral condition and learn the expression thereof.

Figure 7:
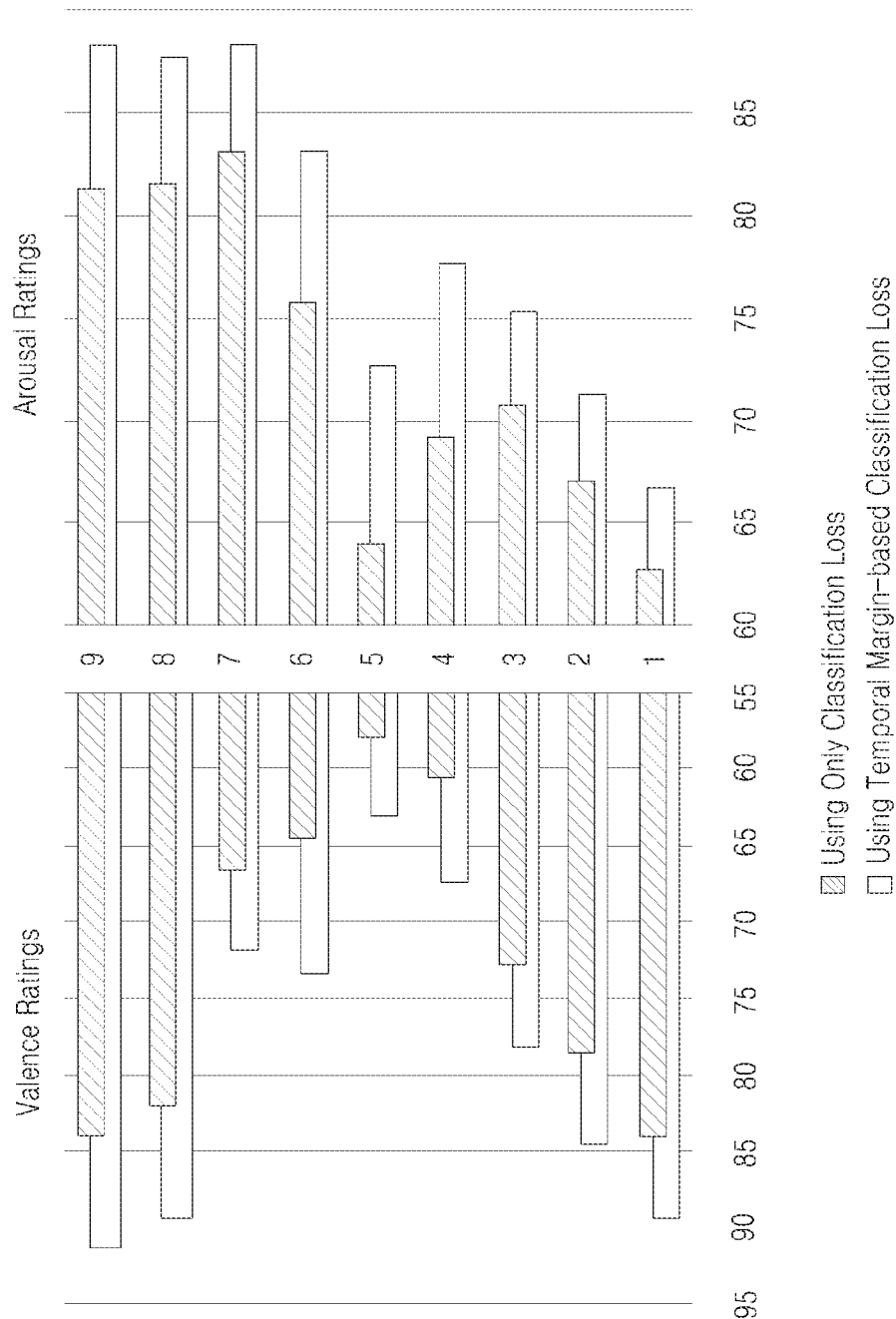
FIG. 7 illustrates an exemplary view of the average accuracy of valence and arousal ratings, which have improved recognition performance, by using the loss function of the present disclosure during training.

FIG. 7 illustrates an exemplary view of the average accuracy of valence and arousal ratings, which have improved recognition performance, by using the loss function of the present disclosure during training. As illustrated in FIG. 7, it is understood that the loss function of the present disclosure, that is, the temporal margin-based classification loss function is more effective in learning the ConvLSTM model for emotion recognition, it is understood that the average accuracy of 6.3% for the valence rating and the average accuracy of 6.2% for the arousal rating are improved, as compared to the ConvLSTM model trained using only classification loss. In addition, the loss function according to an embodiment of the present disclosure is effective with respect to valence and arousal ratings between 4 and 6. As illustrated in FIGS. 5 and 6, the valence and arousal ratings between 4 and 6 are difficult to be classified due to the physiological similarity between the corresponding ratings. It is understood that the temporal margin-based classification loss function according to an embodiment of the present disclosure improves the recognition performance in the rating between 4 and 6 compared to the other rating: this may mean that the temporal margin-based classification loss function according to an embodiment of the present disclosure is applicable to recognizing various types of emotions.

As such, the method according to an embodiment of the present disclosure may learn a deep learning network by using the margin-based classification loss function, thereby improving the accuracy of emotion estimation.

Furthermore, the DPAN according to an embodiment of the present disclosure may provide the following contributions.

1) Robust model for capturing and tracking emotion changes: The present disclosure presents the DPAN based on ConvLSTM modeling of a multi-modal physiological characteristic, thereby identifying emotional states depending on a two-dimensional emotional model, in which each of the valence and the arousal is axis.

2) Temporal margin-based classification loss function: The temporal margin classification loss function may be provided to better learn the models capable of identifying emotional states, and it is understood that the model according to an embodiment of the present disclosure is significantly improved compared with the ConvLSTM model, which is learned only when the classification loss is used in emotion recognition task.

3) Effect analysis of emotional lateralization on emotion recognition: The correlation between emotion lateralization, emotion valence, and emotion arousal, which are obtained from the classification result of the present disclosure system for potential applications in everyday technology, is presented: and the better understanding of the limitations of differentiators that have experienced inter-subject variability and intra-subject variability is provided.

As described above, the method according to an embodiment of the present disclosure is estimating a user's emotion by using the temporal margin-based classification loss function considering a temporal margin and is using the temporal margin-based classification loss function in estimating the user's emotion by using the physiological signal obtained with respect to the user. That is, another embodiment of the present disclosure may obtain the physiological signal of the user and may estimate the user's emotion corresponding to the obtained physiological signal by using the temporal margin-based classification loss function considering the temporal margin.

The method according to an embodiment of the present disclosure may be implemented with an emotion estimating system. For example, the emotion estimating system according to an embodiment of the present disclosure may include an obtainment unit, a learning unit, and an estimation unit. In addition, the components herein may vary depending on the situation.

The obtainment unit obtains the physiological signal of the user.

Herein, the obtainment unit may obtain at least one physiological signal of an EEG signal and a PPG signal of the user with respect to an image sequence.

The learning unit learns a network, which receives the obtained physiological signal, by using a temporal margin-based classification loss function considering a temporal margin, when the learning is in progress along a time axis.

Herein, the learning unit may learn a Convolutional LSTM network by using the temporal margin classification loss function.

Furthermore, the learning unit may extract a physiological feature of the obtained physiological signal with respect to an image sequence, may configure a spectrum-time tensor by using the extracted physiological feature; and inputting the configured spectrum-time tensor to learn the network such that the temporal margin-based classification loss function converges to a minimized value.

In addition, when the learning unit obtains a physiological signal by using a plurality of modalities, the learning unit may configure a three-dimensional tensor including spectrum-time-modality by using the extracted physiological features and modality.

The temporal margin-based classification loss function may assign a penalty such that the temporal margin over time is maintained or continuously increases and may calculate the temporal margin based on a cross-entropy loss function and a discriminative margin corresponding to a difference between an emotional score for a ground truth label of a specific emotion rating and a maximum emotional score for other emotion ratings.

The estimation unit estimates the emotion of the user through the learning of the network using the temporal margin-based classification loss function.

Herein, the estimation unit may estimate a user's emotion based on the temporal margin by using the temporal margin-based classification loss function of above-described Equation 7 and Equation 8.

Even though the description in a system of the present disclosure is omitted, it will be apparent to those skilled in the art that the system according to an embodiment of the present disclosure can include all content described in FIGS. 1 to 7.

The above-described system or device may be implemented with hardware elements, software elements, and/or a combination of hardware elements and software elements. For example, the systems, the devices and components described in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments of the inventive concept or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to various embodiments of the present disclosure, it is possible to generate a physiological model based on a deep learning network, for example, DPAN and a temporal margin-based loss function and to recognize human emotions by using the generated physiological model, thereby improving the performance of emotion recognition.

Since the present disclosure can estimate a user's emotion by using the temporal margin-based loss function and a physiological signal including an EEG signal and a PPG signal, the present disclosure may be applied to an existing emotion recognition system and may be applied to various applications in a real-life environment.

Furthermore, the present disclosure may be applied to a technology for grasping the user's emotional response to content in medical fields, content in a virtual/augmented reality, and the like.

In addition, with the development of a technology of miniaturizing a sensor for measuring brain waves, the present disclosure may be extended to the wearable market, and may be used in everyday life through the manufacture of a wearable device for measuring brain waves, which is capable of operating in conjunction with a smartphone of a user.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for estimating emotion, the method comprising:
    obtaining a physiological signal of a user;
    learning a network, which receives the obtained physiological signal, by using a temporal margin-based classification loss function which is defined based on a temporal margin, when the learning is in progress along a time axis wherein the temporal margin is defined over time between two time points along the time axis; and
    estimating an emotion of the user through the learning of the network using the temporal margin-based classification loss function.

2. The method of claim 1, wherein the obtaining of the physiological signal includes:
    obtaining at least one physiological signal of a brain wave signal and a heartbeat signal of the user from an image sequence.

3. The method of claim 1, wherein the temporal margin-based classification loss function assigns a penalty such that the temporal margin over time is maintained or continuously increases.

4. The method of claim 1, wherein the learning includes:
extracting a physiological feature for the obtained physiological signal with respect to an image sequence;
configuring a spectrum-time tensor by using the extracted physiological feature; and
inputting the configured spectrum-time tensor to learn the network such that the temporal margin-based classification loss function converges to a minimized value.

5. The method of claim 1, wherein the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

6. The method of claim 1, wherein the learning includes:
learning a Convolutional Long Short-Term Memory (LSTM) network by using the temporal margin-based classification loss function.

7. A method of estimating emotion, the method comprising:
providing a temporal margin-based classification loss function which is defined based on a temporal margin, when learning is in progress along a time axis wherein the temporal margin is defined over time between two time points along the time axis; and
estimating an emotion of a user through learning using the temporal margin-based classification loss function.

8. The method of claim 7, wherein the estimating includes:
extracting a physiological feature for a physiological signal of the user obtained with respect to an image sequence;
configuring a spectrum-time tensor by using the extracted physiological feature; and
estimating the emotion of the user by inputting the configured spectrum-time tensor to learn the network such that the temporal margin-based classification loss function converges to a minimized value.

9. The method of claim 7, wherein the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

10. An emotion estimating system comprising:
an obtainment unit configured to obtain a physiological signal of a user;
a learning unit configured to learn a network, which receives the obtained physiological signal, by using a temporal margin-based classification loss function which is defined based on a temporal margin, when learning is in progress along a time axis wherein the temporal margin is defined over time between two time points along the time axis; and
an estimation unit configured to estimate an emotion of the user through the learning of the network using the temporal margin-based classification loss function.

11. The emotion estimating system of claim 10, wherein the obtainment unit is configured to:
obtain at least one physiological signal of a brain wave signal and a heartbeat signal of the user from an image sequence.

12. The emotion estimating system of claim 10, wherein the temporal margin-based classification loss function assigns a penalty such that the temporal margin over time is maintained or continuously increases.

13. The emotion estimating system of claim 10, wherein the learning unit is configured to:
extract a physiological feature of the obtained physiological signal with respect to an image sequence;
configure a spectrum-time tensor by using the extracted physiological feature; and
input the configured spectrum-time tensor to learn the network such that the temporal margin-based classification loss function converges to a minimized value.

14. The emotion estimating system of claim 10, wherein the temporal margin-based classification loss function calculates the temporal margin based on a cross-entropy loss function and a discriminative margin corresponding to a difference between an emotional score for a ground truth label of a specific emotion rating and a maximum emotional score for other emotion ratings.

15. The emotion estimating system of claim 10, wherein the learning unit is configured to:
learn a LSTM network by using the temporal margin-based classification loss function.

16. A method for estimating emotion, the method comprising:
obtaining a physiological signal of a user; and
estimating an emotion of the user corresponding to the physiological signal by using a temporal margin-based classification loss function which is defined based on a temporal margin, wherein the temporal margin is defined over time between two time points.

17. The method of claim 16, wherein the estimating includes:
learning a network, which receives the obtained physiological signal, by using the temporal margin-based classification loss function, when learning is in progress along a time axis; and
estimating an emotion of the user through the learning of the network using the temporal margin-based classification loss function.

* * * * *